United States Patent
Falco, Jr.

(10) Patent No.: US 8,773,435 B2
(45) Date of Patent: Jul. 8, 2014

(54) TEMPORARY LOW RESOLUTION RENDERING OF 3D OBJECTS

(71) Applicant: Adobe Systems Incorporated, San Jose, CA (US)

(72) Inventor: Peter F. Falco, Jr., Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/663,198

(22) Filed: Oct. 29, 2012

(65) Prior Publication Data

US 2013/0050212 A1 Feb. 28, 2013

Related U.S. Application Data

(63) Continuation of application No. 11/609,781, filed on Dec. 12, 2006, now Pat. No. 8,300,050.

(60) Provisional application No. 60/867,558, filed on Nov. 28, 2006.

(51) Int. Cl.
*G06T 15/00* (2011.01)

(52) U.S. Cl.
USPC .......................................... 345/428; 345/629

(58) Field of Classification Search
None
See application file for complete search history.

(56) References Cited

U.S. PATENT DOCUMENTS

| | | | |
|---|---|---|---|
| 5,263,136 A * | 11/1993 | DeAguiar et al. | 345/538 |
| 5,528,259 A | 6/1996 | Bates et al. | |
| 5,894,308 A | 4/1999 | Isaacs | |
| 6,016,150 A | 1/2000 | Lengyel et al. | |
| 6,069,637 A | 5/2000 | Gaglione et al. | |
| 6,184,888 B1 | 2/2001 | Yuasa et al. | |
| 6,396,503 B1 | 5/2002 | Goss et al. | |
| 6,469,700 B1 | 10/2002 | Munshi et al. | |
| 6,525,732 B1 | 2/2003 | Gadh et al. | |
| 6,608,628 B1 | 8/2003 | Ross et al. | |
| 6,611,272 B1 | 8/2003 | Hussain et al. | |
| 6,614,444 B1 | 9/2003 | Duluk et al. | |

(Continued)

FOREIGN PATENT DOCUMENTS

CN 101542534 9/2009

OTHER PUBLICATIONS

"Advisory Action", U.S. Appl. No. 11/609,781, (Nov. 18, 2010), 4 pages.

(Continued)

*Primary Examiner* — Daniel Hajnik
*Assistant Examiner* — Andrew G Yang
(74) *Attorney, Agent, or Firm* — Wolfe-SBMC (57) ABSTRACT

3D scenes may be rendered a resolution lower than a resolution associated with the resultant image. A graphics application or 3D editor may render the 3D artwork at a lower resolution while the user modifies or manipulates the 3D model from which the artwork is derived. In some embodiments, an image may include multiple image layers, each representing a portion of the overall finished image. Graphics programs generally associate a target resolution with an image. Rendering 3D artwork at high resolutions may take extra time and result in poor performance. Thus, in some embodiments, a graphics program may be configured to render 3D artwork at a lower resolution than the resultant image's target or associated resolution while a user is modifying the 3D model. Subsequently, after the user has completed manipulating the 3D model, the graphics program may render the 3D model again at the image's associated resolution.

20 Claims, 6 Drawing Sheets

(56) References Cited

U.S. PATENT DOCUMENTS

| | | | |
|---|---|---|---|
| 6,707,458 | B1 | 3/2004 | Leather et al. |
| 6,744,434 | B2 | 6/2004 | Kindratenko et al. |
| 6,747,649 | B1 | 6/2004 | Sanz-Pastor et al. |
| 6,888,546 | B1 | 5/2005 | Kim |
| 6,933,946 | B1 | 8/2005 | Silva et al. |
| 6,952,207 | B1 | 10/2005 | Santodomingo et al. |
| 6,956,566 | B2 | 10/2005 | Gelb |
| 6,975,318 | B2 | 12/2005 | Junkins et al. |
| 7,079,142 | B2 | 7/2006 | Chiu et al. |
| 7,142,209 | B2 | 11/2006 | Uyttendael et al. |
| 7,167,171 | B2 | 1/2007 | Heim et al. |
| 7,212,217 | B1 * | 5/2007 | Feather et al. ............ 345/630 |
| 7,355,597 | B2 | 4/2008 | Laidlaw et al. |
| 7,483,029 | B2 | 1/2009 | Crow et al. |
| 7,483,042 | B1 | 1/2009 | Glen |
| 7,523,411 | B2 | 4/2009 | Carlin |
| 7,545,392 | B2 | 6/2009 | Sprang et al. |
| 8,059,124 | B2 | 11/2011 | Falco, Jr. |
| 2002/0101420 | A1 | 8/2002 | Pai et al. |
| 2002/0101421 | A1 | 8/2002 | Pallister |
| 2002/0113796 | A1 | 8/2002 | Oshiyama et al. |
| 2002/0135599 | A1 | 9/2002 | Yokouchi |
| 2003/0058238 | A1 | 3/2003 | Doak et al. |
| 2004/0125138 | A1 | 7/2004 | Jetha et al. |
| 2004/0130552 | A1 | 7/2004 | Duluk et al. |
| 2005/0243085 | A1 | 11/2005 | Schechter et al. |
| 2005/0243086 | A1 | 11/2005 | Schechter et al. |
| 2006/0093044 | A1 | 5/2006 | Grantham et al. |
| 2006/0139357 | A1 | 6/2006 | Iourcha et al. |
| 2006/0170706 | A1 * | 8/2006 | Hoffman et al. ............ 345/629 |
| 2006/0171582 | A1 | 8/2006 | Eichhorn |
| 2006/0187229 | A1 | 8/2006 | Shao et al. |
| 2006/0209078 | A1 | 9/2006 | Anderson et al. |
| 2006/0256136 | A1 | 11/2006 | O'Donnell et al. |
| 2008/0122835 | A1 | 5/2008 | Falco, Jr. |

OTHER PUBLICATIONS

"Final Office Action", U.S. Appl. No. 11/609,781, (Sep. 15, 2009), 10 pages.

"Final Office Action", U.S. Appl. No. 11/609,781, (Sep. 16, 2011), 13 pages.

"Final Office Action", U.S. Appl. No. 11/609,781, (Sep. 3, 2010), 14 pages.

"Non-Final Office Action", U.S. Appl. No. 11/609,781, (Mar. 31, 2010), 13 pages.

"Non-Final Office Action", U.S. Appl. No. 11/609,781, (Apr. 15, 2009), 9 pages.

"Non-Final Office Action", U.S. Appl. No. 11/609,781, (Apr. 4, 2011), 12 pages.

"Notice of Allowance", U.S. Appl. No. 11/609,781, (Jun. 26, 2012), 11 pages.

"PCT Search Report and Written Opinion", Application No. PCT/US2007/085770, (Apr. 25, 2008), 7 pages.

"U.S. Application as Filed", U.S. Appl. No. 11/609,771, filed Dec. 12, 2006, 34 pages.

Antochi, Iosif et al., "Efficient State Management for Tile-Based 3D Graphics Architectures", *15th Annual Workshop on Circuits, Systems and Signal Processing*, Nov. 25-26, 2004, Veldhoven, The Netherlands, pp. 336-340, available at <http://ce-publications.et.tudelft.nl/publication/view/id/974>,(Nov. 25, 2004), 5 pages.

no author, "Adobe PDF Reference Archives," Nov. 2004, Adobe Systems Incorporated, Fifth Edition, pp. 746 and 763.

Antochi, Juurlink, Vassiliadis and Liuha, "Efficient State Management for Tile-Based 3D Graphics Architectures," pp. 346-340, Nov. 25, 2004.

International Search Report from PCT/US 07/85770, mailed Nov. 28, 2007, pp. 1-9.

* cited by examiner

TEMPORARY LOW RESOLUTION RENDERING OF 3D OBJECTS

This application is a continuation of U.S. patent application Ser. No. 11/609,781, filed Dec. 12, 2006, which claims priority to U.S. Provisional Patent Application No. 60/867,558, titled "Temporary Low Resolution Rendering of 3D objects", filed on Nov. 28, 2006, whose inventor is Peter F. Falco, Jr., and which are herein incorporated by reference in their entirety.

BACKGROUND

1. Field of the Invention

The present invention is directed to computer systems. More particularly, it is directed to graphical image processing.

2. Description of the Related Art

Three-dimensional (3D) graphics rendering is a process of generating an image from a 3D model, generally by means of software programs and/or graphics hardware. The model is generally a description of 3D objects in a strictly defined language or data structure and may contain geometry, viewpoint, texture and lighting information. A 3D model may include polygons, such as triangles, representing the surface of the 3D model. The polygons from the 3D model may be drawn, rendered or rasterized onto a two-dimensional (2D) surface, such as a computer screen.

Large complex images may be defined using layers. Layers are independent images that can be manipulated as if each layer were an independent image. Each layer only forms a part of the final image. Layers are like transparencies stacked one on top of one another. Each layer may have different objects, images and effects. Layers allow users to work on separate images in order to modify sections without changing the entire image. When the layers are stacked, the images appear as if they are all a single image. The final image will be made up from all of the layers within the image depending on the order of the layers.

When rendering a scene, the resolution of the image traditionally was limited to the computer screen size, but there may be times when a higher resolution image is needed. Higher resolution images may be divided into multiple image tiles that each fit in the graphics frame buffer. The image may be rendered tile by tile, with the results saved into off screen memory, a MIP map, or even a file. By subdividing the image to be rendered into a grid, and then rendering each region separately, a series of partial images can be generated that may be tiled onto a larger image surface to form the final image.

SUMMARY 3D scenes, artwork or models may be rendered at lower resolutions to improve performance and response time. For instance when a user manipulates the 3D artwork, the graphics application may render the modified artwork at a lower resolution, while the user continues to modify or manipulate the 3D model. In some embodiments, an image may include multiple image layers, each representing a portion of the overall finished image. In some embodiments, one or more of the layers may include a 3D rendered image. A user may be able to modify or manipulate the 3D model and in response the graphics program may render a new image of the 3D model reflecting the user's changes. For example, a user may select to rotate a 3D model in one layer of a compound image. The user may rotate the 3D model to various positions before being satisfied with the new rotation.

Generally, a graphics program associates a target resolution with an image. Rendering the 3D model at high target resolutions may take extra time and result in poor performance. For instance, the graphics program may render the 3D model multiple times while the user is modifying or manipulating the 3D model. If each rendering is performed at a high resolution, the performance of the 3D modeler may suffer as compared to lower-resolution renderings of the same 3D model. Thus, in some embodiments, a graphics program may be configured to render a 3D model at a lower resolution than the resultant image's target or associated resolution while a user is modifying the 3D model. Subsequently, after the user has completed manipulating the 3D model, the graphics program may render the 3D model again at the image's target resolution.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A graphics application may be configured to render 3D scenes in a tiled, raster environment. Generally, each image in a tiled, raster environment has an associated or specified resolution in terms of pixels. In other words, an image naturally has a particular size in terms of pixels associated with it. For instance, when creating a new image, a user may specify the overall size of the image in pixels, such as 800×600 or 1280×1024. Thus, when drawing or rendering objects into an image, a graphics application may be configured to render the objects at the resolution specified for the image. Additionally, rather than render the entire image at once at the specified resolution, the graphics application may be configured to render the image as a set of image tiles, where each image tile represents a small portion of the overall image. Using multiple image tiles to render an image, especially a large, high-resolution image, may prevent having to load the entire image into memory.

A graphics application may also allow an image document to include multiple image layers as described above. In some embodiments, the graphics application may allow 3D artwork or scenes to be included as layers in an image document. Thus, the graphics application may be configured to render 3D scenes from 3D models and include the rendered scenes as one or more layers in an image document. In some embodiments, the graphics application may be configured to temporarily render 3D scenes at a lower resolution than that specified for the final image and may further be configured to render the 3D scene without using multiple image tiles, as will be described in more detail below.

In 3D computer graphics, MIP maps (also mipmaps) may be considered pre-calculated, optimized collections of bitmap images intended to increase rendering speed and reduce artifacts. The letters "MIP" in the name are an acronym of the Latin phrase multum in parvo, meaning "much in a small space". Each image of the MIP map may be a copy of the same main image, but at a lower resolution. Although the main image may be used when the size of the view is sufficient to render it in full detail, the renderer may switch to a suitable MIP map image (or interpolate between the two nearest) when the image is viewed at a smaller size. Rendering speed may increase when using MIP maps since the number of pixels being processed can be much lower when using the lower resolution copies of the main image. Additionally, the individual images in a MIP map may be split into multiple image tiles in order to support tiled-based rendering at the various resolutions included in the MIP map. For example, after a user has changed some portion of an image, the graphics application may only re-render those individual tiles that include the modified portion of the image.

Figure 1:
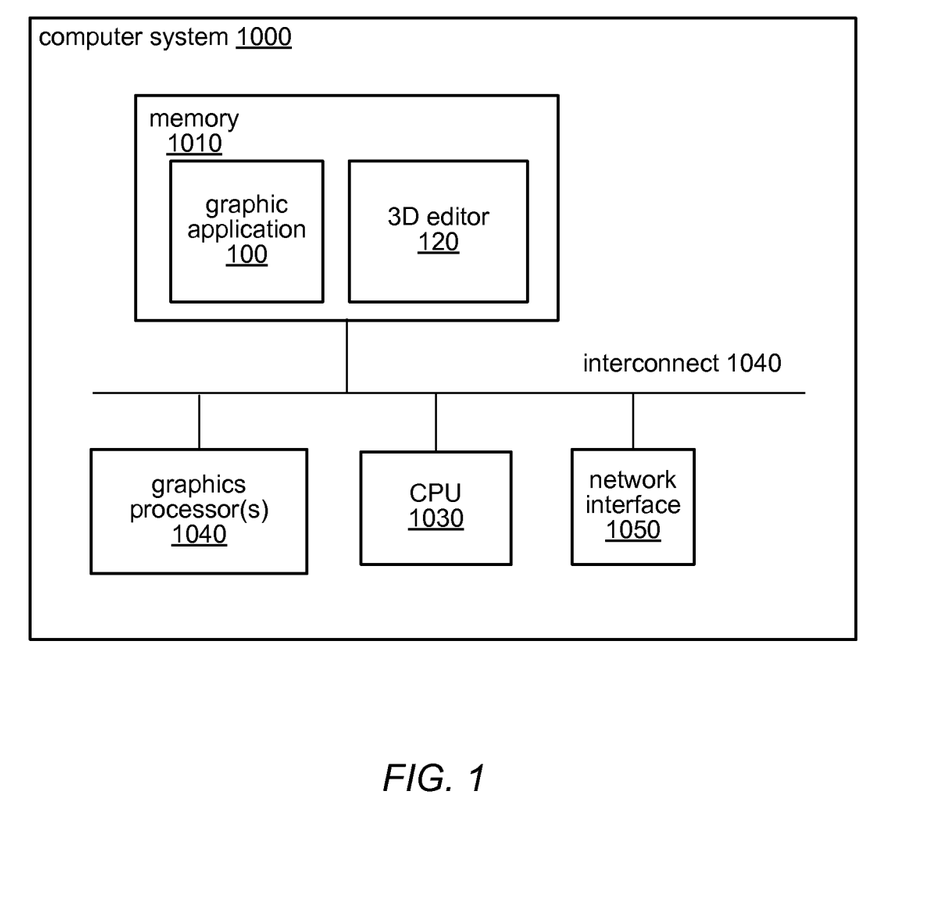
FIG. 1 is a block diagram illustrating one embodiment of a computer system capable of implementing temporary low resolution rendering of 3D objects, as described herein.

FIG. 1 is a block diagram illustrating one embodiments of a computer system 1000 suitable for implementing the temporary low resolution rendering of 3D objects and rendering 3D objects using a single image tile in a tiled, raster environment, as described herein. Computer system 1000 may include a graphics application 100 configured to render 3D scenes in a tiled, raster environment. For example, graphics application 100 may represent various types of graphics applications, such as painting, publishing, photography, games, animation, and other applications. Graphics application 100 may also include a 3D editor 120 configured to manipulate and render 3D models, objects and scenes. Please note that while FIG. 1 illustrates 3D editor 120 as separate from graphics application 100, in some embodiments, 3D editor may be part of graphics application 100. In other embodiments, 3D editor 120 may represent a separate application, utility and/or library that graphics application 100 may communicate with and/or use to generate, manipulate and/or render 3D models, objects, artwork, or scenes.

Additionally, graphics application 100 and/or 3D editor 120 may utilize a graphics processor 1040 when manipulating and/or rendering 3D artwork. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them must faster than drawing directly to the screen with a host central processing unit (CPU), such as CPU 1030. Thus, graphics application 100 and/or 3D editor 120 may be configured to model, edit and/or render 3D artwork either alone or by utilizing graphics processor 1040, according to various embodiments. Please note that functionality and/or features described herein as being part of, or performed by, graphics application 100 and/or 3D editor 120 may, in some embodiments, be part of, or performed by, one or more graphics processors, such as graphics processor 1040.

As described above, graphics application 100 may be configured to work with and/or generate images including multiple layers, one or more of which may include 3D artwork, objects or scenes. Additionally, graphics application 100 may include functionality allowing a user to generate and manipulate (modify or change) 3D artwork in a layer of a multi-layer image. For instance, in some embodiments graphics application 100 may include 3D editor 120 that may be configured to provide a user interface for editing, modifying or otherwise manipulating 3D artwork. For example, graphics application 100 and/or 3D editor 120, may be configured to provide a user interface that allows a user to select an image layer including 3D artwork and to modify one or more properties, features, and/or attributes of the 3D artwork. After the user has completed manipulating the 3D artwork, graphics application 100 and/or 3D editor may render the modified 3D artwork and composite it with the rest of the image layers.

As mentioned above, a multi-layer image in a tiled, raster environment is generally associated with, or specifies, a pixel resolution. In some embodiments, a user may specify a resolution for an image. In other embodiments, the specified resolution may be dictated or determined by other factors, such as the supported resolutions of equipment, such as displays or printers. Rendering 3D artwork at high resolutions may take considerable time and memory resources. Thus, graphics application 100 and/or 3D editor 120 may be configured to temporarily render 3D objects at a resolution lower than the specified resolution. For example, in one embodiment 3D editor 120 may render the 3D scene at a lower resolution, such as at the screen resolution, than a resolution specified by the overall image or document including the 3D artwork. 3D editor 120 may be configured to render 3D artwork using a lower resolution when a user is editing, modifying or otherwise manipulating the 3D artwork.

After the user has finished editing the 3D artwork, 3D editor 120 may be configured to render the 3D artwork at the resolution specified for the final image document. Temporarily rendering 3D artwork at a lower resolution may allow 3D editor 120 and/or graphics application 100 to provide better performance and response time, such as when a user is editing 3D artwork. Render the 3D artwork at a high resolution after each change or modification made to the 3D artwork may result in poor performance and the response time. In other words, a user modifying 3D artwork may have to wait an unreasonable amount of time after each modification to see rendered result. Since, users frequently make many small changes when modifying 3D artwork, rendering the 3D artwork at a lower resolution may increase performance and reduce the amount of time a user must wait before seeing the rendered result of each modification.

Figure 2A:
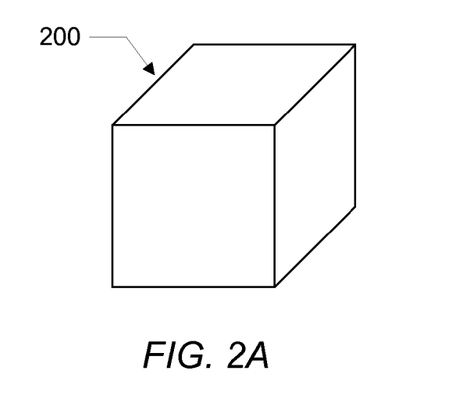
FIGS. 2A-2E are block diagrams illustrating temporary low resolution rendering of 3D objects, according to one embodiment.
Figure 2B:
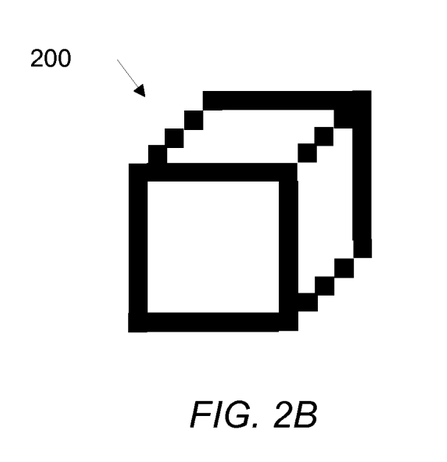

For example, a user may be editing an image that includes a 3D model of a cube as a layer. FIG. 2A illustrates a cube 200 that may be included as a layer in an image, as described herein. Cube 200 may represent a layer of a larger image, or may represent a single image without any additional layers, according to different embodiments. If the user desires to rotate cube 200, graphics application 100 and/or 3D editor 120 may be configured to present a user interface allowing manipulation of the 3D artwork. For example, graphics application 100 may be configured to change into a 3D editor mode, possible utilizing 3D editor 120 in some embodiments. 3D editor 120 may then be configured to allow the user to edit the 3D model and/or to perform various manipulations, such as panning, rotating, cross-sectioning, etc. However, as noted above, 3D editor 120 may be configured to temporarily render the 3D artwork at a lower resolution than the resolution specified by the overall image of which the 3D artwork is a part. Thus, as illustrated in FIG. 2B, 3D editor 120 may, in one embodiment, first render the 3D artwork, such as cube 200 in FIG. 2B, as a lower resolution, as indicated by the larger line size of cube 200. For example, 3D editor 120 may render cube 210 at the resolution of the screen or display rather than at a higher resolution specified by or associated with the image to which the 3D artwork belongs.

In some embodiments, 3D editor 120 may be configured to render 3D artwork at a lower resolution whenever the user enters a 3D editing mode of graphics application 100 and/or 3D editor 120. In other embodiments, however, 3D editor 120 may not render the 3D artwork at a lower resolution until the user actually changes or modifies something about the artwork requiring the re-rendering of the artwork. In yet other embodiments, 3D editor 120 may be configured to allow the user to select when to use a lower resolution to render 3D artwork. Additionally, different hardware, such as graphics memory, configuration may result in differing performance and response times when 3D artwork is edited. Thus, in some embodiments, graphics application 100 and/or 3D editor 120 may be configured to allow the user to specify the resolution at which 3D artwork is rendered when the 3D artwork is being edited.

Figure 2C:
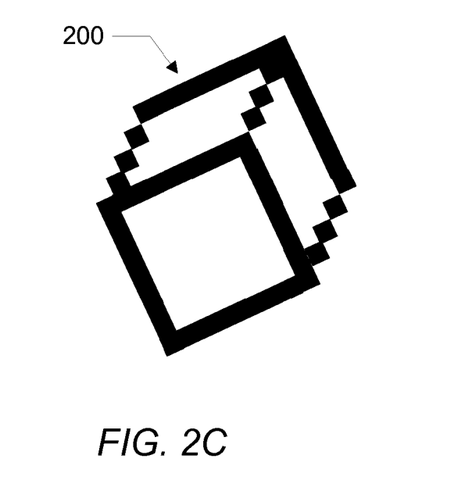
Figure 2D:
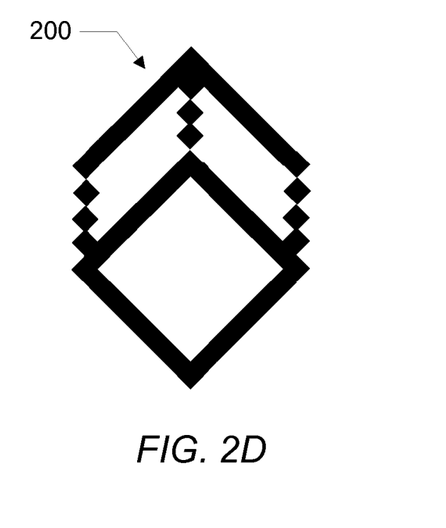
Figure 2E:
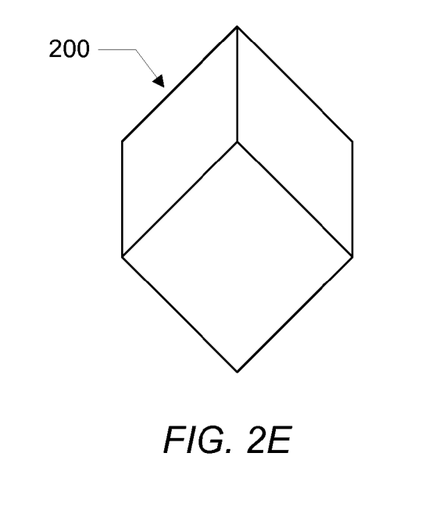

As noted above, when the user is manipulating the 3D artwork, such as cube 200, 3D editor 120 may temporarily, such as while the user is manipulating the 3D artwork, render the artwork at a lower resolution than that specified for finished image. FIG. 2C illustrates cube 200 rotated to the left, according to one embodiment. After the user modifies the 3D artwork, such as specifying that cube 200 should be rotated, 3D editor 120 may re-render cube 200 reflecting the new rotation. 3D editor 120 may re-render cube 200 as a lower resolution, as illustrated in FIG. 2C, possibly providing better performance and faster response time to the user. The user may then decide to rotate cube 200 even more, and in response 3D editor 120 may re-render the cube at the lower resolution to reflect the new rotation. When the user has finished modifying or manipulation the 3D artwork, 3D editor 120 may be configured to re-render the 3D artwork at the higher resolution specified by or associated with the overall image to which the 3D artwork belongs, as illustrated by FIG. 2E. Graphics application 100 and/or 3D editor 120 may also composite the newly rendered 3D artwork with other elements and/or layers of the overall image. Please note that FIGS. 2B-2D illustrate rendering cube 200 in a much lower resolution than that illustrated in FIG. 2A and FIG. 2E, for ease of illustration and discussion. In other embodiments, different resolutions may be used.

In some embodiments, graphics application 100 and/or 3D editor 120 may be configured to provide a 3D editing mode or user interface separate from modes or user interfaces allowing editing or manipulating of 2D artwork included in an image or document. 3D editor 120 may be configured to temporarily render 3D artwork at a lower resolution whenever the user is editing 3D artwork in the 3D editing mode or user interface. Thus, when the user begins using the 3D editing mode or user interface, 3D editor 120 may begin to use a lower resolution to render the 3D artwork. Additionally, when the user exits or stops using the 3D editing mode or user interface, 3D editor 120 may render the 3D artwork at the higher resolution specified by or associated with the final image or document.

Thus, 3D editor 120 may be configured to recognize when a user enters and exits a 3D editing mode or user interface and temporarily render 3D artwork at a lower resolution while the user is in the 3D editing mode or user interface, according to some embodiments. In other embodiments, 3D editor 120 may be configured to start and stop rendering 3D artwork at the lower resolution based on other factors. For example, in one embodiments, 3D editor 120 may be configured to stop rendering 3D artwork at a lower resolution and to render the artwork at a higher resolution when ever a certain amount of time has elapsed since the user last modified or manipulated the 3D artwork. In other words, after a certain amount of idle time, 3D editor 120 may re-render the 3D artwork at the higher resolution. If the user subsequently makes another modification (rotation, transformation, panning, etc) to the 3D artwork, 3D editor 120 may be configured to begin temporarily rendering the 3D artwork at the lower resolution again, according to some embodiments. In yet other embodiments, 3D editor 120 and/or graphics application 100 may be configured to allow the user to specify when 3D artwork should again be rendered at the higher resolution. For instance, the user may select a particular menu item or other user interface element that specifies that the user desires to see the 3D artwork rendered at the higher resolution. For example, the user may desire to preview the results of one or more modifications to the 3D artwork at the higher resolution before exiting the 3D editing mode or user interface, according to one embodiment.

Figure 3:
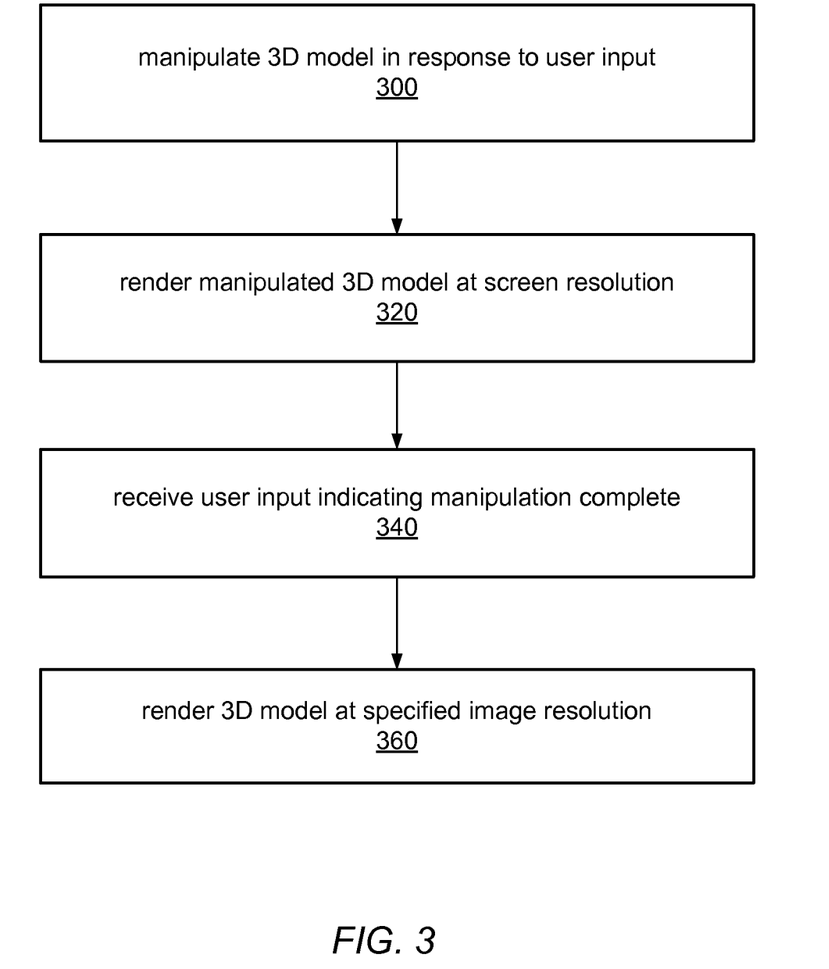
FIG. 3 is a flowchart illustrating one embodiment of a method for temporary low resolution rendering of 3D objects.

FIG. 3 is a flowchart illustrating one embodiment of method for temporarily rendering 3D artwork at lower resolutions, as described herein. As noted above, in some embodiments, a graphics application, such as graphics application 100 and/or 3D editor 120 may provide functionality allowing a user to modify or manipulate 3D artwork, such as might be included as one layer of a multi-layer image or document. Thus, 3D editor 120 may manipulate a 3D model in response to user input, as indicated by block 300. For instance, the user may specify various changes or modifications, such as panning, cross-sectioning, rotating, etc., to the 3D artwork or model. 3D editor 120 may then render the manipulated 3D model at a lower resolution, such as at the resolution of the screen, graphics card, or display currently being used, as indicated by block 320. As noted above, 3D editor 120 may be configured to re-render the 3D artwork after each change or edit by the user and rendering the artwork at a lower resolution, such as at the screen resolution, may result in better performance and faster response time to the user's modifications. Thus the user may be able to more quickly see the results of any particular manipulation of the 3D artwork at the lower resolution.

In some embodiments, 3D editor 120 may be configured to determine that the user has finished editing the 3D artwork, such as by receiving user input indicating that the user has finished manipulating the artwork, as illustrated by block 340. For example, in some embodiments, the user may explicitly exit a particular 3D editing mode or user interface. In response to determining that the user has finished modifying the 3D artwork, 3D editor 120 may render the 3D artwork at the resolution specified by or associated with the final image, as indicated by block 360.

Please note that FIG. 3 illustrates only one possible embodiment, and that 3D editor 120 may, in other embodiments, determine when to render 3D artwork at different resolutions based on different actions, events or user input. For example, 3D editor 120 may re-render modified 3D artwork at the higher image resolution after a certain amount of idle time has elapsed without the user modifying the 3D artwork. In other embodiments, 3D editor may allow the user to request that modified 3D artwork be rendered at the higher image resolution specifically, such as to preview the modified 3D artwork at the higher resolution prior to compositing the 3D scene into the final image.

Additionally, graphics application 100 and/or 3D editor 120 may be configured to render 3D artwork using a single image tile even when working with images in tiled, raster environment. Typically, large images, especially 2D images, are rendered multiple (sometimes) many individual image tiles, or sub-images. However, rendering 3D artwork using multiple image tiles may result in poor performance because every element of the 3D model (sometimes called the geometry), such as every vertex, polygon, texture, and shader, may have to be transformed—generally a mathematically expensive operation, to determine whether or not that element is visible, and hence should be rendered, in any individual image tile. When rendering 3D artwork in a tiled manner, every element of the 3D model may have to be analyzed, such as by transformation, for every image tile to determine what elements should be rendered for each image tile.

Figure 4A:
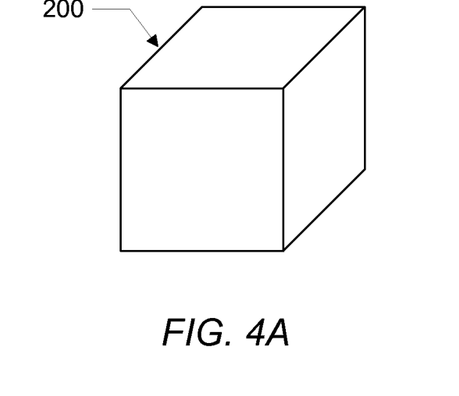
FIGS. 4A through 4C are block diagrams illustrating interactive rendering of 3D scenes in a raster tiled environment, in one embodiment.

However, in some embodiments, graphics application 100 and/or 3D editor 120 may be configured to render 3D artwork in a non-tiled manner. In other words, 3D editor 120 may be configured to temporarily render 3D artwork using as a single image tile, even when the rest of the image, such as other layers of multi-layer image, may be rendered in a tiled manner. For example, 3D editor 120 may be configured to allow a user to manipulate or modify 3D artwork that is included as one layer of a multi-layer image or document in a tiled, raster environment. Rather than rendering the 3D artwork in a tiled, and therefore potentially slow, manner 3D editor 120 may be configured to temporarily render the 3D artwork in a non-tiled (or single image tile) manner at least while the 3D artwork is being modified or manipulated. For instance, FIG. 4A illustrates cube 200 and 3D editor 120 may allow the user to modify or manipulate cube 200, as described above. As noted above, graphics application 100 and/or 3D editor 120 may include a 3D editing mode, tool, or user interface allowing a user to modify or manipulate 3D artwork, such as when a layer of multi-layer image includes 3D artwork.

Figure 4B:
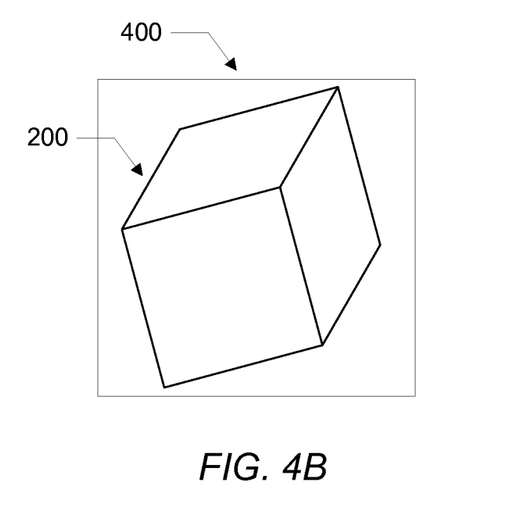
Figure 4C:
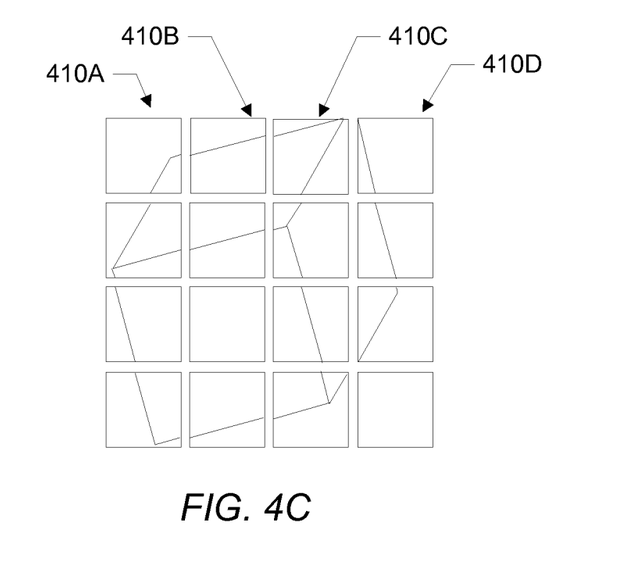

In tiled, raster environments, an image, such as a multi-layer image, may be rendered using multiple image tiles, such as from a MIP map. Thus, in some embodiments, 3D editor 120 may be configured to render 3D artwork into multiple image tiles in order to support the tiled rendering of the overall or final image. When the user is manipulating the 3D model or artwork, such as rotating cube 200 as illustrated in FIG. 4B, a tiled rendering of the 3D artwork may result in slower performance and longer response times. Thus, in some embodiments, 3D editor 120 may be configured to temporarily render the 3D artwork in non-tiled manner or as a single tile, such as to avoid multiple rendering traversals of the 3D scene to determine what needs to be rendered in each image tile. For example, FIG. 4B illustrates cube 200 being rendered as a single image tile 400, according to one embodiment. As the user modifies or manipulates the 3D artwork, such as cube 200, 3D editor 120 may render the 3D artwork after each modification to display the resultant 3D artwork to the user. After the user has finished manipulating the 3D artwork, 3D editor 120 may re-render the 3D artwork in a tiled manner, such as to support the tiled rendering of the overall, multi-layer image. FIG. 4C illustrates cube 200 rendered using multiple image tiles, such as image tiles 410A, 410B, 410C and 410D. For example, when a user desires to modify or manipulate 3D artwork that is part of a large image, 3D editor 120 may be configured to treat the 3D artwork, at least while being manipulated, as a single, large image tile and only after the user has finished manipulating the 3D artwork to then render the 3D artwork into the multiple, individual image tiles.

In a tiled, raster environment, graphics application 100 and/or 3D editor 120 may be configured to support MIP maps including multiple copies of an image at different resolutions and each image copy in the MIP map may be split into individual image tiles, as described above. Additionally, in some embodiments, 3D editor 120 may be configured to render the manipulated 3D artwork as multiple image tiles at different resolutions, such as in order to support a MIP map. Thus, 3D editor 120 may, in some embodiments, be configured to render 3D artwork using multiple, tiled, resolutions in order to support MIP map based rendering of the overall image to which the 3D artwork belongs. In some embodiments, 3D editor 120 may be configured to render the 3D artwork as a single, large image tile and then split the rastered pixel data into the multiple image tiles. In other embodiments, however, 3D editor 120 may be configured to re-render the manipulated 3D artwork in a fully tiled manner.

Figure 5:
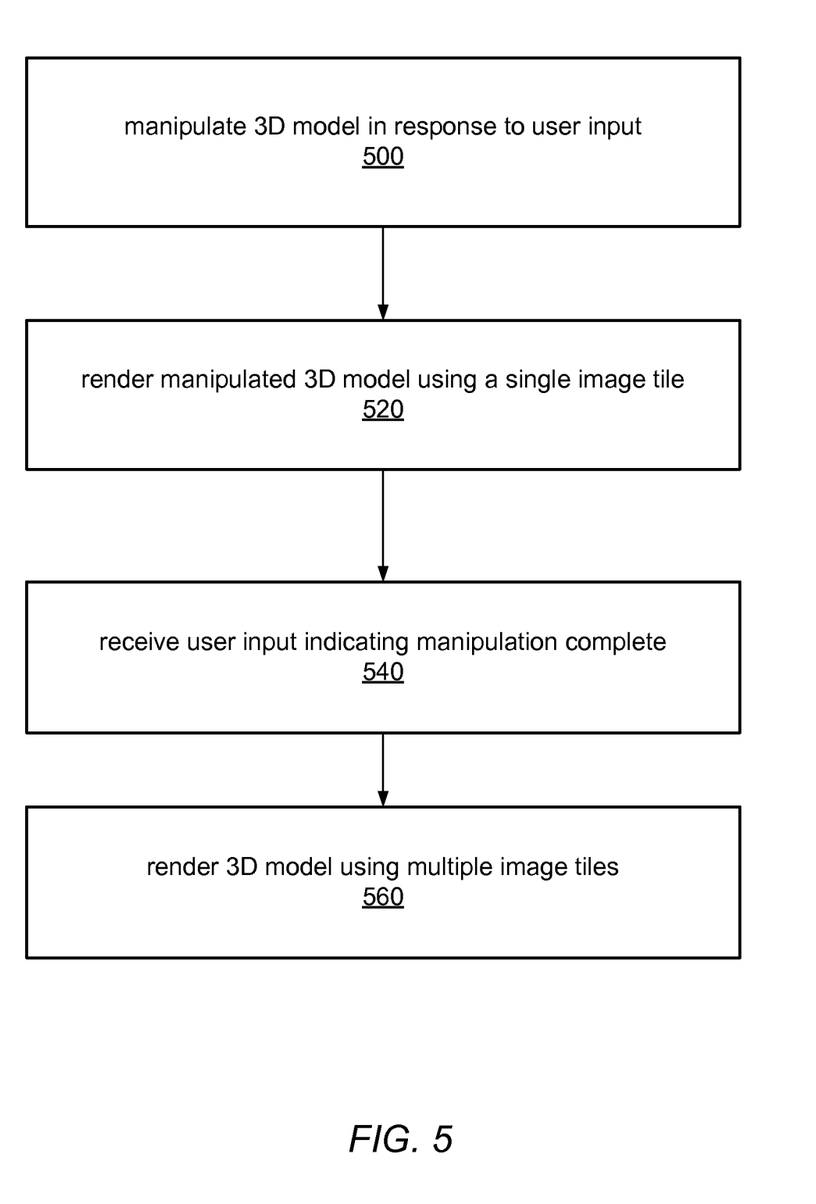
FIG. 5 is a flowchart illustrating one embodiment of a method for interactive rendering of 3D scenes in a tiled raster environment, as described herein.

FIG. 5 is a flowchart illustrating one embodiment of method for temporarily rendering 3D artwork as a single image tile in a multi-tiled rendering environment, as described herein. As noted above, in some embodiments, a graphics application, such as graphics application 100 and/or 3D editor 120 may provide functionality allowing a user to modify or manipulate 3D artwork, such as might be included as one layer of a multi-layer image or document. Thus, 3D editor 120 may manipulate a 3D model in response to user input, as indicated by block 500. For instance, the user may specify various changes or modifications, such as panning, cross sectioning, rotating, etc., to the 3D artwork or model. 3D editor 120 may then render the manipulated 3D model in a non-tiled manner or as a single image tile, as indicated by block 520. As noted above, 3D editor 120 may be configured to re-render the 3D artwork after each change or edit by the user and rendering the artwork as a single image tile may result in better performance and faster response time to the user's modifications. Thus the user may be able to more quickly see the results of any particular manipulation of the 3D artwork, according to some embodiments.

In some embodiments, 3D editor 120 may be configured to determine that the user has finished editing the 3D artwork, such as by receiving user input indicating that the user has finished manipulating the artwork, as illustrated by block 540. For example, in some embodiments, the user may explicitly exit a particular 3D editing mode or user interface. In response to determining that the user has finished modifying the 3D artwork, 3D editor 120 may render the 3D artwork as a multi-tiled image, as indicated by block 560.

Please note that FIG. 5 illustrates only one possible embodiment, and that 3D editor 120 may, in other embodiments, determine when to render 3D artwork using multiple image tiles based on different actions, events or user input. For example, 3D editor 120 may re-render modified 3D artwork as multiple image tiles after a certain amount of idle time has elapsed without the user modifying the 3D artwork.

As noted above, graphics application 100 and/or 3D editor 120 may be configured to render the manipulated 3D artwork into multiple image tiles at multiple resolutions to support MIP map based rendering of the overall image. In some embodiments, 3D editor 120 may be configured to render manipulated 3D artwork into multiple image tiles at multiple resolutions in response to the user completing the manipulation of the 3D artwork. In other embodiments, however, 3D editor 120 may be configured to render of the manipulate 3D artwork as multiple image tiles only at resolutions currently needed and to delay rendering the manipulated 3D artwork as multiple image tiles at other resolutions until those resolutions are needed.

Figure 6:
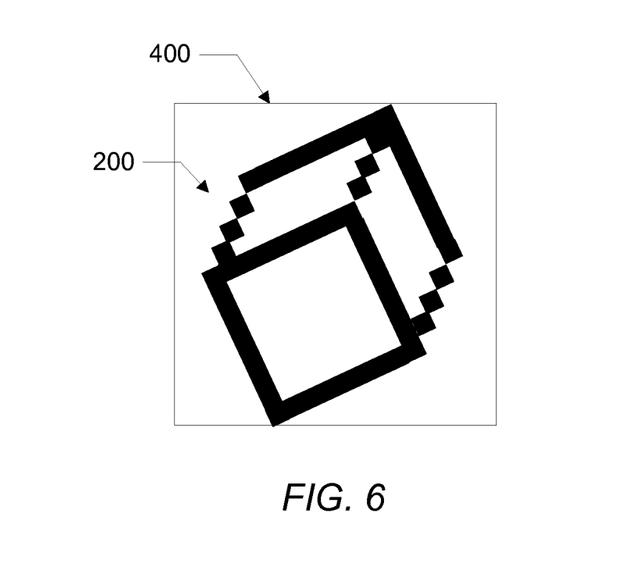
FIG. 6 is a block diagram illustrating 3D artwork rendered at a lower resolution and as a single image tile, according to one embodiment.

Additionally, graphics application 100 and/or 3D editor 120 may be configured to temporarily render 3D artwork at a lower resolution and as a single image tile, according to some embodiments. For instance, as illustrated in FIG. 6, 3D editor 120 may be configured to temporarily render cube 200 at a lower resolution that the resolution associated with the overall, multi-layer image or document and as a single image tile 400. While the 3D artwork is being manipulated, 3D editor 120 may continue to render the 3D artwork as a single image tile and subsequently render the 3D artwork as multiple image tiles at the resolution associated with the multi-layer image once the manipulation of the 3D artwork is complete, according to some embodiments.

Figure 7:
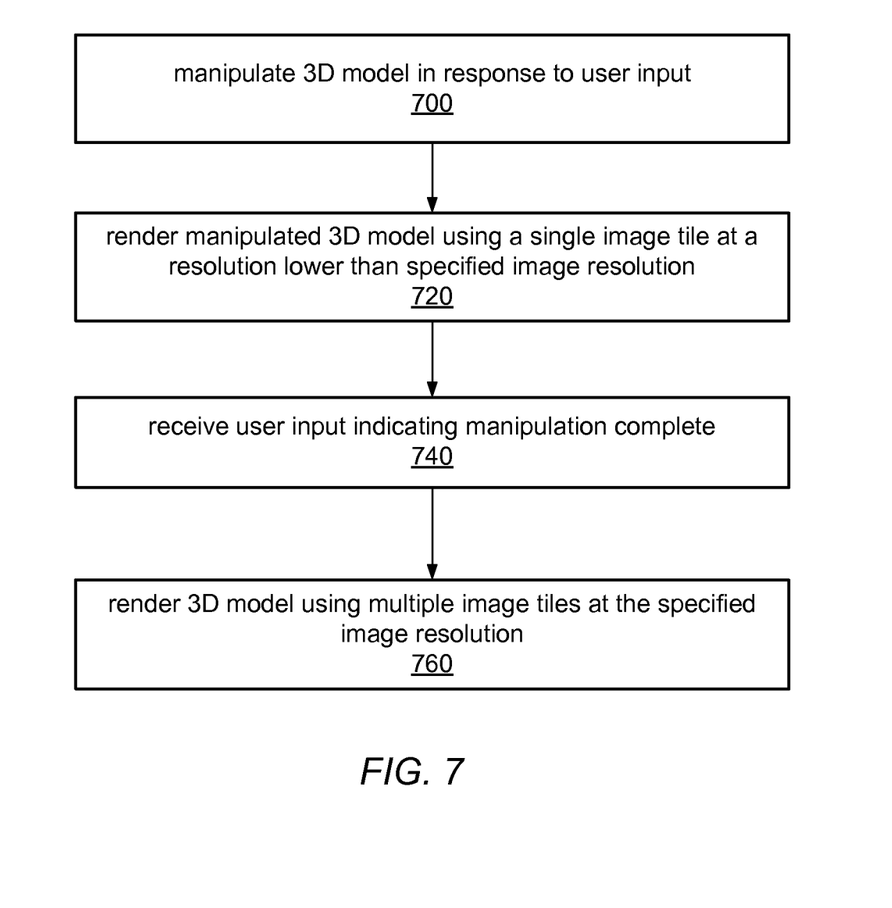
FIG. 7 is a flowchart illustrating one method for interactive rendering of 3D scenes in a tiled raster environment.

FIG. 7 is a flowchart illustrating one embodiment of a method for temporarily rendering 3D artwork as a single image tile and at a lower resolution. As noted above, in some embodiments, a graphics application, such as graphics application 100 and/or 3D editor 120 may provide functionality allowing a user to modify or manipulate 3D artwork, such as might be included as one layer of a multi-layer image or document. Thus, 3D editor 120 may manipulate a 3D model in response to user input, as indicated by block 700. For instance, the user may specify various changes or modifications, such as panning, cross-sectioning, rotating, etc., to the 3D artwork or model. 3D editor 120 may then render the manipulated 3D model in a non-tiled manner or as a single image tile and at a resolution lower than the specified image resolution, as indicated by block 720. As noted above, 3D editor 120 may be configured to re-render the 3D artwork after each change or manipulation by the user and rendering the artwork as a single image tile at a lower resolution may result in better performance and faster response time to the user's modifications. Thus the user may be able to more quickly see the results of any particular manipulation of the 3D artwork, according to some embodiments.

In some embodiments, 3D editor 120 may be configured to determine that the user has finished editing the 3D artwork, such as by receiving user input indicating that the user has finished manipulating the artwork, as illustrated by block 740. For example, in some embodiments, the user may explicitly exit a particular 3D editing mode or user interface. In response to determining that the user has finished modifying the 3D artwork, 3D editor 120 may render the 3D artwork as a multi-tiled image and at the resolution associated with the multi-layer image, as indicated by block 760.

Temporarily rendering 3D artwork at lower resolutions and as a single image tile, as described herein may be implemented on various types of computer systems. Referring again to FIG. 1, computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device.

The 3D editor 120 described herein may be provided as a computer program product, or software, that may include a computer-readable storage medium having stored thereon instructions, which may be used to program a computer system (or other electronic devices) to implement temporarily rendering 3D artwork at low pixel resolutions and as a single image tile in tiled, raster environments, as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the graphics application 100 and/or 3D editor 120 described herein may include fewer or additional components not illustrated in FIG. 1 (e.g., video cards, audio cards, storage devices, additional network interfaces, peripheral devices, or other components). The CPU 1030, the network interface 1050, and the memory 1010 may be coupled to the interconnect 1040. It should also be noted that one or more components of system 1000 might be located remotely and accessed via a network. One or more of the memories 1010 may embody a graphics application 100 and/or a 3D editor 120.

In some embodiments, memory 1010 may include program instructions configured to implement graphics application 100 and/or 3D editor 120, as described herein. Graphics application 100 and/or 3D editor 120 may be implemented in any of various programming languages or methods. For example, in one embodiment, graphics application 100 and/or 3D editor 120 may be JAVA based, while in another embodiments, they may be implemented using the C or C++ programming languages. In other embodiments, graphics application 100 and/or 3D editor 120 may be implemented using specific graphic languages specifically for developing programs executed by specialize graphics hardware, such as GPU 1040. In addition, graphics application 100 and/or 3D editor 120 may be embodied on memory specifically allocated for use by graphics processor(s) 1040, such as memory on a graphics board including graphics processor(s) 1040. Thus, memory 1010 may represent dedicated graphics memory as well as general-purpose system RAM.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 1, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1040 of FIG. 1.

While graphics application 100 and 3D editor 120 have been described with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   performing, by one or more computing devices:
   rendering an image at a first resolution, wherein:
   a computer-generated three-dimensional (3D) model is rendered as one layer of a plurality of layers of the image, the one layer being rendered by dividing the one layer into a plurality of image tiles; and
   a different layer of the plurality of layers includes two-dimensional (2D) artwork for the image separate from the 3D model, the different layer being rendered by dividing the different layer into a different plurality of image tiles;
   in response to a manipulation of the 3D model, switching from rendering the one layer for the 3D model at the first resolution and as a plurality of image tiles, to rendering the one layer for the 3D model at a second resolution that is lower than the first resolution and as a single image tile, while continuing to render the different layer as being divided into the different plurality of image tiles; and
   subsequent to the manipulation of the 3D model, rendering the one layer for the 3D model at the first resolution as a plurality of image tiles.

2. The method of claim 1, wherein a size of each of the plurality of image tiles is less than or equal to a size of a graphics frame buffer.

3. The method of claim 1, wherein said rendering the one layer from the 3D model at the first resolution comprises rendering the one layer from the 3D model at a current screen resolution.

4. The method of claim 1, wherein said rendering the one layer from the 3D model at the first resolution is performed in response to determining that the manipulation of the 3D model is finished.

5. The method of claim 1, wherein said rendering the one layer from the 3D model at the first resolution is performed in response to determining that the 3D model has not been manipulated within a specified amount of time.

6. The method of claim 1, further comprising rendering the one layer from the 3D model at a plurality of different resolutions and storing the resultant plurality of images in a MIP map.

7. The method of claim 1, wherein said rendering the one layer from the 3D model at the second resolution that is lower than the first resolution is performed while a 3D editing mode is active.

8. A system, comprising:
a processor; and
memory coupled to the processor, wherein the memory comprises program instructions executable by the processor to perform operations comprising:
    rendering an image at a first resolution, wherein:
        a computer-generated three-dimensional (3D) model is rendered as one layer of a plurality of layers of the image, the one layer being rendered by dividing the one layer into a plurality of image tiles; and
        a different layer of the plurality of layers includes two-dimensional (2D) artwork for the image separate from the 3D model, the different layer being rendered by dividing the different layer into a different plurality of image tiles;
    in response to a manipulation of the 3D model, switching from rendering the one layer for the 3D model at the first resolution and as a plurality of image tiles, to rendering the one layer for the 3D model at a second resolution that is lower than the first resolution and as a single image tile, while continuing to render the different layer as being divided into the different plurality of image tiles; and
    subsequent to the manipulation of the 3D model, rendering the one layer for the 3D model at the first resolution as a plurality of image tiles.

9. The system of claim 8, wherein a size of each of the plurality of image tiles is less than or equal to a size of a graphics frame buffer.

10. The system of claim 8, wherein the operations comprise, to render the 3D model at the first resolution, rendering the one layer from the 3D model at a current screen resolution.

11. The system of claim 8, wherein the operations comprise:
determining that a user has finished manipulating the 3D model, wherein said rendering the one layer from the 3D model at the first resolution as a plurality of image tiles is performed in response to said determining.

12. The system of claim 8, wherein the operations comprise:
determining that a user has not manipulated the 3D model within a specified amount of time, wherein said rendering the one layer from the 3D model at the first resolution as a plurality of image tiles is performed in response to said determining.

13. The system of claim 8, wherein the operations comprise:
rendering the one layer from the 3D model at a plurality of different resolutions; and
storing the resultant plurality of images in a MIP map.

14. The system of claim 8, wherein said rendering the one layer from the 3D model at the second resolution that is lower than the first resolution is performed while a 3D editing mode is active.

15. A computer-readable storage device storing program instructions configured to be executed by a computing device to cause the computing device to perform operations comprising:
    rendering an image at a first resolution, wherein:
        a computer-generated three-dimensional (3D) model is rendered as one layer of a plurality of layers of the image, the one layer being rendered by dividing the one layer into a plurality of image tiles; and
        a different layer of the plurality of layers includes two-dimensional (2D) artwork for the image separate from the 3D model, the different layer being rendered by dividing the different layer into a different plurality of image tiles;
    in response to a manipulation of the 3D model, switching from rendering the one layer for the 3D model at the first resolution and as a plurality of image tiles, to rendering the one layer for the 3D model at a second resolution that is lower than the first resolution and as a single image tile, while continuing to render the different layer as being divided into the different plurality of image tiles; and
    subsequent to the manipulation of the 3D model, rendering the one layer for the 3D model at the first resolution as a plurality of image tiles.

16. The computer-readable storage device of claim 15, wherein a size of each of the plurality of image tiles is less than or equal to a size of a graphics frame buffer.

17. The computer-readable storage device of claim 15, wherein said rendering the one layer from the 3D model at the first resolution comprises rendering the one layer from the 3D model at a current screen resolution.

18. The computer-readable storage device of claim 15, wherein said rendering the one layer from the 3D model at the first resolution is performed m response to determining that a user has finished manipulating the 3D model.

19. The computer-readable storage device of claim 15, wherein said rendering the one layer from the 3D model at the first resolution is performed in response to determining that a user has not manipulated the 3D model within a specified amount of time.

20. The computer-readable storage device of claim 15, wherein the operations further comprise rendering the one layer from the 3D model at a plurality of different resolutions and storing the resultant plurality of images in a MIP map.

* * * * *